United States Patent [19]
Park

[11] Patent Number: 5,790,324
[45] Date of Patent: Aug. 4, 1998

[54] WIDE-ANGLE PHOTOGRAPHIC LENS SYSTEM

[75] Inventor: Cheon-Ho Park, Kyungki-do, Rep. of Korea

[73] Assignee: Samsung Aerospace Industries, Ltd., Kyeongsangnam-do, Rep. of Korea

[21] Appl. No.: 828,774

[22] Filed: Mar. 27, 1997

[30]    Foreign Application Priority Data

Mar. 29, 1996  [KR]  Rep. of Korea ............... 96-9145

[51] Int. Cl.$^6$ ........................................... G02B 13/04
[52] U.S. Cl. ............................... 359/751; 359/755
[58] Field of Search ........................... 359/750, 751, 359/755, 749

[56]    References Cited

U.S. PATENT DOCUMENTS 4,286,847  9/1981  Nakamura et al. ................ 359/751
4,487,485  12/1984  Hisada ............................. 359/750

*Primary Examiner*—Georgia Y. Epps
*Assistant Examiner*—Dawn-Marie Bey
*Attorney, Agent, or Firm*—Finnegan, Henderson, Farabow, Garrett & Dunner, L.L.P.

[57]    ABSTRACT

A compact wide-angle photographic lens system of a retrofocus type includes, from the object side, a first, a sixth, and a seventh meniscus lens group of positive refractive powers, a second and a third meniscus lens group of negative refractive powers, a fourth lens group of a positive refractive power being convex toward an object side, and a fifth cemented lens group of a negative refractive power. The lens system satisfies the conditions, $1.0 < |f_{(1,2,3,4)}| < 2.0\ f$, $f_{(1,2,3,4)} < 0$, $0.4\ f < d(6)+d(7) < 0.6\ f$, $0.1 < f/r(5) < 0.2$, $0.5 < f/r(11) < 0.7$, $1.65 < [n(7)+n(8)]/2 < 1.75$, where $f$ represents a focal length of overall lens system, $f_{(1,2,3,4)}$ represents a combined focal length of the first, second, third and fourth lens group, $d(6)$ represents a distance between the third lens group and the fourth lens group, $d(7)$ represents a thickness of the fourth lens group, $r(5)$ represents a radius of curvature of the third lens group toward an object side, $r(11)$ represents a radius of curvature of the fifth lens group, $n(7)$ represents a refractive index of the sixth lens group, and $n(8)$ represents a refractive index of the seventh lens group.

3 Claims, 3 Drawing Sheets

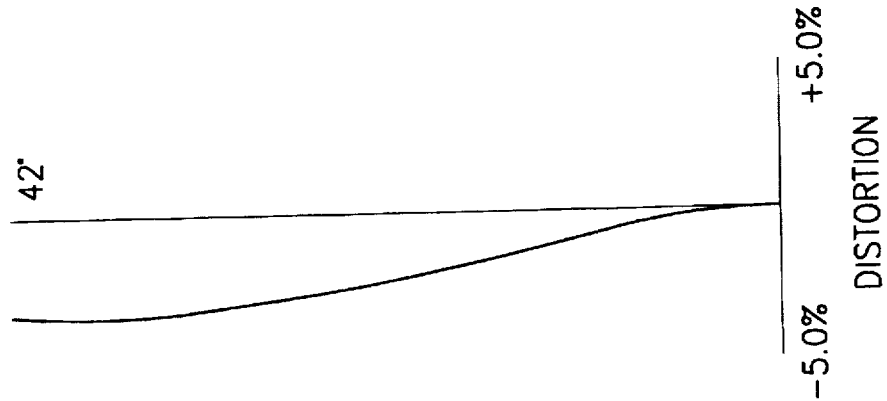
FIG.2C
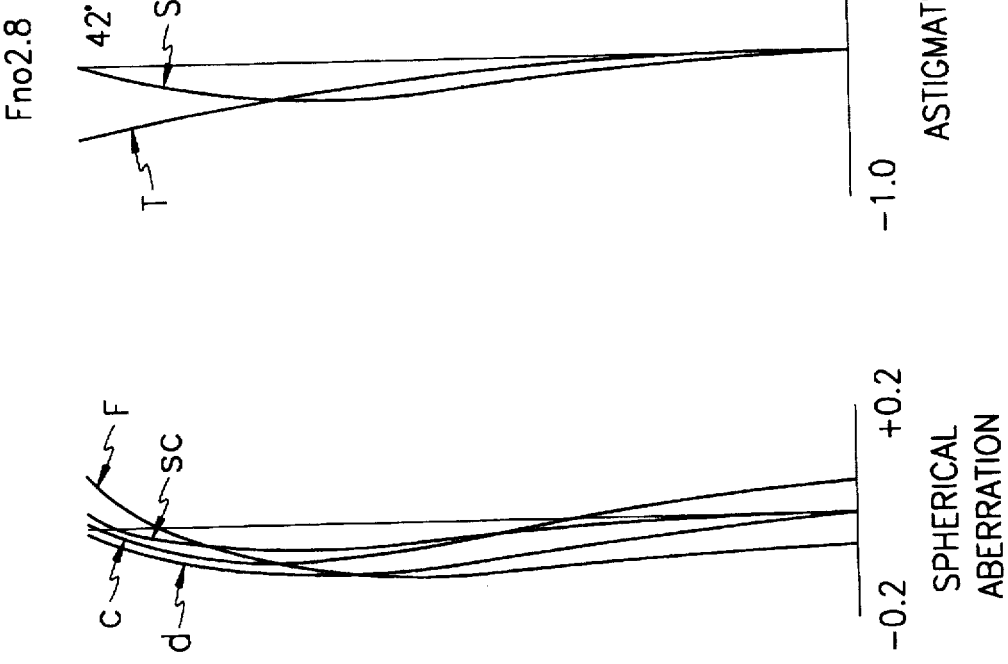
FIG.2B
FIG.2A

5,790,324

WIDE-ANGLE PHOTOGRAPHIC LENS SYSTEM

BACKGROUND OF THE INVENTION

(1) Field of the Invention

The present invention relates to a wide-angle photographic lens system, and more particularly to a compact wide-angle photographic lens system with reduced dimension and minimum numbers of lens elements, for providing improved image quality.

(2) Description of the Related Art

Conventional wide-angle photographic lens systems for single lens reflex cameras are inconvenient to handle due to the dimensional drawback of the total length of the lens system and the radius of the first lens group, which prohibits using a filter in single lens reflex cameras.

Also, due to the difficulty in increasing the radius of a conventional wide-angle lens system for a single lens reflex camera, a small number of lens elements cannot achieve satisfactory brightness and correction of aberrations. Increasing the number of lens elements to overcome the above-described drawbacks degrades the performance of the lens system due to adverse effects such as flare. Further, manufacturing costs increase due to increased occurrence of eccentricity.

Another problem, in addition to the limited number of lens elements in a conventional wide-angle lens system, results from unsatisfactory aberration correction around the circumference of a viewing angle.

SUMMARY OF THE INVENTION

It is therefore an object of the present invention to provide a compact wide-angle lens system of a retrofocus type, whose aperture ratio is 1:2.8, viewing angle is about 82 degrees and back focal length is about 1.5 times a focal length, by reducing the total length and minimizing the outside diameter of a first lens group.

A wide-angle photographic lens system according to the present invention comprises, from an object side, a first lens group having a positive refractive power, a second lens group having a negative refractive power, a third lens group having a negative refractive power, a fourth lens group having a positive refractive power, a fifth lens group having a negative refractive power, a sixth lens group having a positive refractive power, and a seventh lens group having a positive refractive power.

The wide-angle photographic lens system satisfies the following conditions:

$$1.0 < |f_{(1,2,3,4)}| < 2.0 f, \; f_{(1,2,3,4)} < 0 \quad (1)$$

$$0.4 f < d(6) + d(7) < 0.6 f, \quad (2)$$

where f represents a focal length of an overall lens system, $f_{(1,2,3,4)}$ represents a combined focal length of the first, second, third and fourth lens groups; d(6) represents a distance between the third lens group and the fourth lens group; and d(7) represents a thickness of the fourth lens group.

In the wide-angle lens system according to the present invention, the first, second, third, sixth, and seventh lens groups are meniscus lenses, the fourth lens group is convex toward an object side, and the fifth lens group is a cemented lens.

The wide-angle lens system according to the present invention further satisfies the following conditions:

$$0.1 < f/r(5) < 0.2 \quad (3)$$

$$0.5 < f/r(11) < 0.7 \quad (4)$$

$$1.65 < [n(7) + n(8)]/2 < 1.75, \quad (5)$$

where r(5) represents a radius of curvature of the third lens group toward an object side, r(11) represents a radius of curvature of the fifth lens group, n(7) represents a refractive index of the sixth lens group, and n(8) represents a refractive index of the seventh lens group.

BRIEF DESCRIPTION OF THE DRAWINGS

FIGS. 2A to 2C show diagrams illustrating lens aberrations according to the first embodiment of the present invention.

DETAILED DESCRIPTION OF THE PREFERRED EMBODIMENTS

The above object and features of the present invention will be apparent from the following description of the embodiments with reference to the accompanying drawings.

Figure 1:
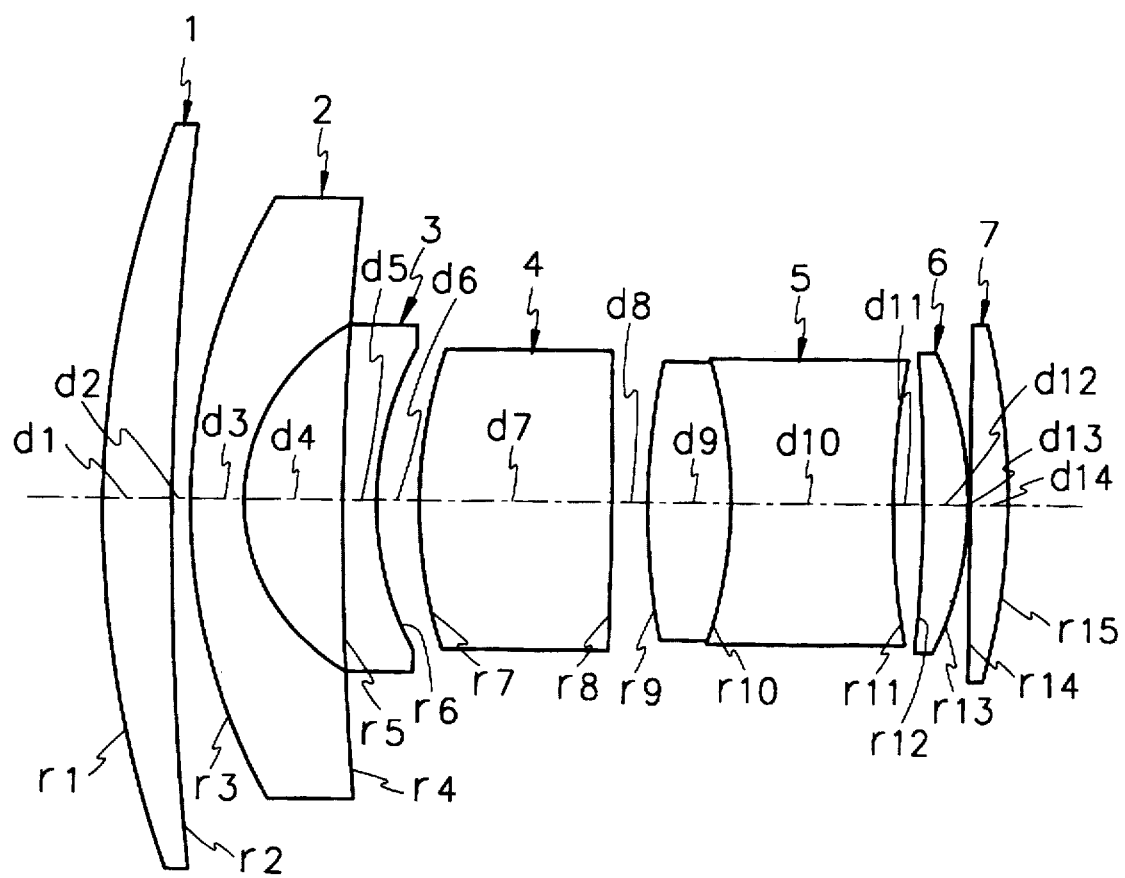
FIG. 1 shows a lens configuration of a compact wide-angle photographic lens system according to a first embodiment of the present invention.

Referring to FIG. 1, a compact wide-angle photographic lens system, as embodied herein, comprises, from an object side, a first lens group 1 having a positive refractive power, a second lens group 2 having a negative refractive power, a third lens group 3 having a negative refractive power, a fourth lens group 4 having a positive refractive power, a fifth lens group 5 having a negative refractive power, a sixth lens group 6 having a positive refractive power, and a seventh lens group 7 having a positive refractive power.

In the wide-angle lens system according to the present invention, the first, second, third, sixth, and seventh lens groups are meniscus lenses, the fourth lens group is convex toward an object side, and the fifth lens group is a cemented lens.

The wide-angle photographic lens system satisfies the following conditions:

$$1.0 < |f_{(1,2,3,4)}| < 2.0 f, \; f_{(1,2,3,4)} < 0 \quad (1)$$

$$0.4 f < d(6) + d(7) < 0.6 f, \quad (2)$$

where f represents a focal length of an overall lens system, $f_{(1,2,3,4)}$ represents a combined focal length of the first, second, third and fourth lens groups; d(6) represents a distance between the third lens group and the fourth lens group; and d(7) represents a thickness of the fourth lens group.

The wide-angle lens system according to the present invention further satisfies the following conditions:

$$0.1 < f/r(5) < 0.2 \quad (3)$$

$$0.5 < f/r(11) < 0.7 \quad (4)$$

$$1.65 < [n(7) + n(8)]/2 < 1.75, \quad (5)$$

where r(5) represents a radius of curvature of the third lens group toward an object side, r(11) represents a radius of curvature of the fifth lens group, n(7) represents a refractive index of the sixth lens group, and n(8) represents a refractive index of the seventh lens group.

The performance of a wide-angle lens system of the above configuration is described in the following.

A value of $|f_{(1,2,3,4)}|$ of condition (1) approaching the lower limit, 1.0 f, strengthens a diverging refractive power and increases a negative distortion and astigmatism, making correction of the distortion and astigmatism by the front five lens groups from the first to the fifth lens group difficult. Therefore, the value should be kept higher than the lower limit, 1.0 f, in condition (1).

A value of $|f_{(1,2,3,4)}|$ of condition (1) approaching the upper limit, 2.0 f, weakens the diverging refractive power and makes a desired back focal length unobtainable. Therefore, the value should be kept lower than the upper limit, 2.0 f, in condition (1).

Condition (2) relates to the condition for obtaining a back focal length under condition (1). A value of d(6)+d(7) of condition (2) falling below the lower limit, 0.4 f, causes axial incidence rays to reach the rear lens group with insufficient incident elevation, regardless of a negative refractive index of the front lens group which includes up to the fourth lens group from the object side, making a desired back focal length unobtainable.

A value of d(6)+d(7) exceeding the upper limit, 0.6 f, increases an overall length of the lens system and an effective diameter of the front lens group, making the manufacture of a compact photographic lens system difficult.

Condition (3) relates to a correction of a spherical aberration and a coma flare. A value of f/r(5) of condition (3) falling below the lower limit, 0.1, makes a negative spherical aberration at a fifth surface r(5) too small to be corrected. A value of f/r(5) exceeding the upper limit, 0.2, makes a positive coma flare too large to be corrected.

Condition (4) relates to a correction of a coma flare. A value of f/r(11) of condition (4) falling below the lower limit, 0.5, makes a negative coma flare at an eleventh surface r(11) too small to be corrected. A value of f/r(11) exceeding the upper limit, 0.7, makes a Petzval sum too small to correct an astigmatism.

Condition (5) specifies a condition for protecting a Meridional field curvature and a spherical aberration at the rear side of the lens system from falling to a negative region. Therefore, the sixth lens group 6 and the seventh lens group 7 preferably have the largest possible refractive index. The lower limit in condition (5) specifies a limit value of [n(7)+n(8)] to be as large as possible.

In order to satisfy a condition of chromatic elimination at the rear side of the lens system, Abbe numbers of the sixth lens group 6 and the seventh lens group 7 should be large. However, no commercially available glass lens has a large Abbe number and refractive index. The upper limit of condition (5), therefore, represents a limited value obtainable by commercially available glass. A glass lens whose refractive index exceeds the upper limit of the condition (5) cannot correct a chromatic aberration unless it has an Abbe number that satisfies a condition of chromatic elimination.

Referring to the above conditions, preferred embodiments according to the present invention are described as follows in connection with the annexed drawings.

The numerical data of the first embodiment are shown in Table 1, where ri(i=1-15) represents a radius of curvature, di(i=1-14) represents a lens thickness or distance between lenses, Nd represents the refractive index of each lens for sodium d-line, VD represents an Abbe number of each lens, a focal length (f) is 100 mm, an aperture ratio is 1:2.8, and a viewing angle is 84°. Values for all distance quantities, including ri and di, are expressed in millimeters.

TABLE 1

| Surface Number | ri | di | Nd | VD |
|---|---|---|---|---|
| 1 | 228.41000 | 14.1700 | 1.67003 | 47.20 |
| 2 | 716.89000 | 3.8300 | | |
| 3 | 130.24000 | 10.7900 | 1.62280 | 56.91 |
| 4 | 41.64000 | 20.5000 | | |
| 5 | 662.32000 | 6.7900 | 1.63854 | 55.45 |
| 6 | 69.67000 | 8.5400 | | |
| 7 | 103.13000 | 39.6200 | 1.75520 | 27.53 |
| 8 | −1377.49000 | 7.5000 | | |
| 9 | 150.60000 | 17.1700 | 1.69680 | 55.46 |
| 10 | −98.25000 | 33.2500 | 1.80518 | 25.46 |
| 11 | 159.26000 | 6.3700 | | |
| 12 | −319.04000 | 9.1200 | 1.72000 | 50.34 |
| 13 | −75.60000 | 0.4200 | | |
| 14 | −30915.97000 | 7.7900 | 1.67790 | 55.52 |
| 15 | −150.29000 | | | |

In the first embodiment of the present invention, when the back focal length is 156.76 and the lens thickness is 185.86, the values of the conditions (1)-(5) are as follows:

$f_{(1,2,3,4)}$: −156.97 d(6)+d(7): 48.16 f/r(5): 0.15 f/r(11): 0.63

[n(7)+n(8)]/2: 1.70

FIGS. 2A–2C show spherical aberrations, astigmatism, and distortion, respectively, for the first embodiment. In FIG. 2A the horizontal axis represents focus shift in millimeters and the vertical axis represents decreasing aperture. Spherical aberration is shown for "c", "d", and "F" wavelengths. And, "SC" means the offense of Sine Condition. In FIG. 2B, the horizontal axis represents focus shift in millimeters and the vertical axis represents increasing angle from the optical axis of the lens, for S and T axes of rotation. In FIG. 2C, the horizontal axis represents percentage distortion and the vertical axis represents increasing angle from the optical axis of the lens.

The numerical data of the second embodiment are shown in Table 2, where a back focal length is 155.41, a lens thickness is 180.66, and a focal length, an aperture ratio, and a viewing angle are the same as the first embodiment.

TABLE 2

| Surface Number | ri | di | Nd | VD |
|---|---|---|---|---|
| 1 | 239.51000 | 13.6600 | 1.67003 | 47.20 |
| 2 | 766.18000 | 0.4200 | | |
| 3 | 125.63000 | 13.1600 | 1.62280 | 56.91 |
| 4 | 41.91000 | 21.0800 | | |
| 5 | 768.32000 | 12.7900 | 1.63854 | 55.45 |
| 6 | 62.12000 | 7.0800 | | |
| 7 | 87.19000 | 34.7400 | 1.75520 | 27.53 |
| 8 | −906.27000 | 7.2500 | | |
| 9 | 165.75000 | 14.3300 | 1.69680 | 55.46 |
| 10 | −81.62000 | 31.1600 | 1.80518 | 25.46 |
| 11 | 160.34000 | 6.8700 | | |
| 12 | −298.33000 | 10.1200 | 1.72000 | 50.34 |
| 13 | −72.19000 | 0.4200 | | |
| 14 | −3200.07000 | 7.5800 | 1.67790 | 55.52 |
| 15 | −149.40000 | | | |

In the second embodiment of the present invention as shown above, the values of the conditions (1)-(5) are as follows:

$f_{(1,2,3,4)}$: −178.28 d(6)+d(7): 41.82 f/r(5): 0.13 f/r(11): 0.62

[n(7)+n(8)]/2: 1.70

Figure 3C:
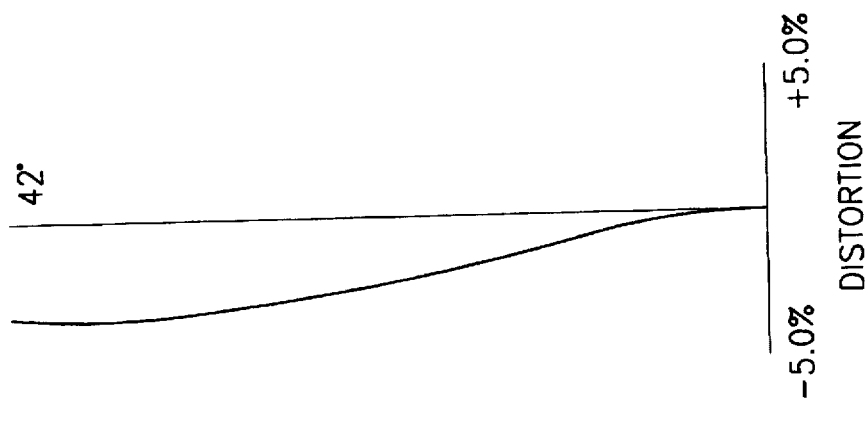
FIGS. 3A to 3C show diagrams illustrating lens aberrations according to the first embodiment of the present invention.
Figure 3B:
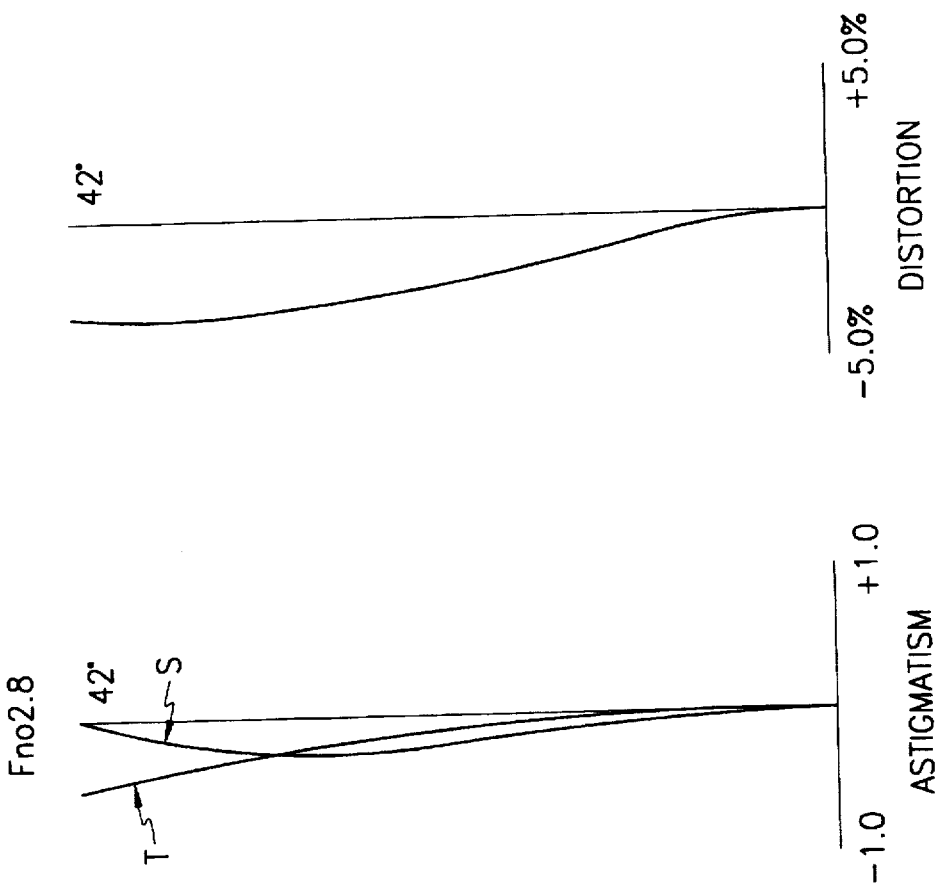
Figure 3A:
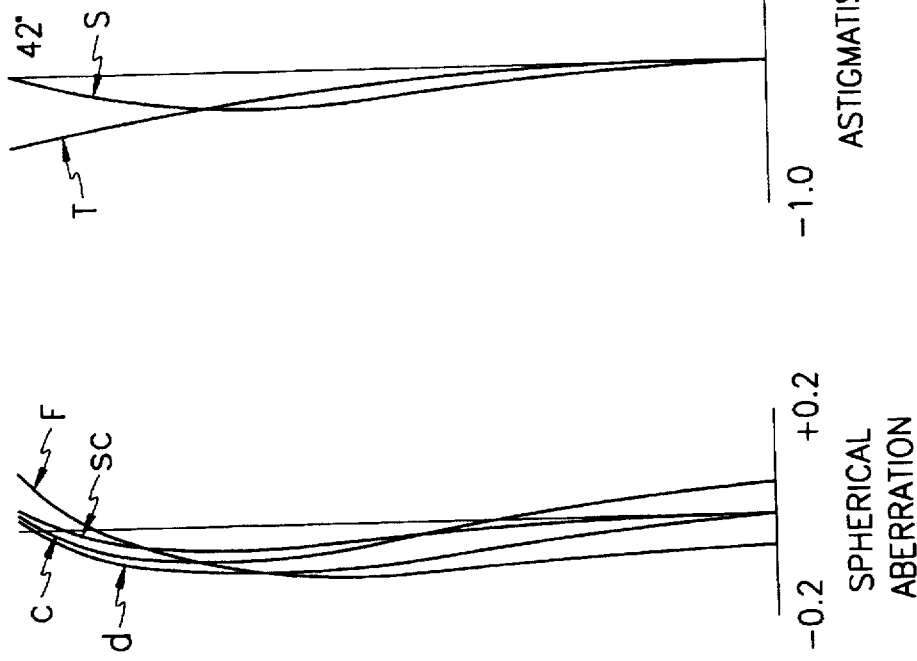

FIGS. 3A–3C are graphs showing spherical aberration, astigmatism, and distortion, respectively, for the second embodiment using the same configurations as FIGS. 2A–2C.

According to the embodiments of the present invention set forth in the above description, a compact wide-angle lens system of a retrofocus type is provided, whose aperture ratio is 1:2.8, viewing angle is about 82 degree, and back focal length is about 1.5 times a focal length, by reducing the overall length of the lens system and minimizing the outside diameter of a first lens group. Focusing the overall lens system with a mode of forward projection and arranging the refractive power of the front lens group and the rear lens group properly reduces the overall length.

What is claimed is:

1. A compact wide-angle photographic lens system comprising from an object side:

a first lens group having a positive refractive power;

a second lens group having a negative refractive power;

a third lens group having a negative refractive power;

a fourth lens group having a positive refractive power;

a fifth lens group having a negative refractive power;

a sixth lens group having a positive refractive power; and a seventh lens group having a positive refractive power, wherein said wide-angle photographic lens system satisfies the following conditions:

$$1.0 f < |f_{(1,2,3,4)}| < 2.0 f, f_{(1,2,3,4)} < 0; \text{ and}$$

$$0.4 f < d(6)+d(7) < 0.6 f,$$

where f represents a focal length of overall lens system, $f_{(1,2,3,4)}$ represents a combined focal length of the first, second, third and fourth lens groups, d(6) represents a distance between the third lens group and the fourth lens group, and d(7) represents a thickness of the fourth lens group, and wherein the first lens group is a meniscus lens;

the second lens group is a meniscus lens;

the third lens group is a meniscus lens;

the fourth lens group is convex toward an object side;

the fifth lens group is a cemented lens;

the sixth lens group is a meniscus lens; and the seventh lens group is a meniscus lens.

2. A compact wide-angle photographic lens system according to claim 1, further satisfying the following conditions:

$$0.1 < f/r(5) < 0.2;$$

$$0.5 < f/r(11) < 0.7; \text{ and}$$

$$1.65 < [n(7)+n(8)]/2 < 1.75,$$

where r(5) represents a radius of curvature of a surface of the third lens group toward the object side, r(11) represents a radius of curvature of the fifth lens group of a closest surface to an image side, n(7) represents a refractive index of the sixth lens group, and n(8) represents a refractive index of the seventh lens group.

3. A compact wide-angle photographic lens system comprising from an object side:

a first lens group having a positive refractive power;

a second lens group having a negative refractive power;

a third lens group having a negative refractive power;

a fourth lens group having a positive refractive power;

a fifth lens group having a negative refractive power;

a sixth lens group having a positive refractive power; and a seventh lens group having a positive refractive power, wherein said wide-angle photographic lens system satisfies the following conditions:

$$1.0 f < |f_{(1,2,3,4)}| < 2.0 f, f_{(1,2,3,4)} < 0; \text{ and}$$

$$0.4 f < d(6)+d(7) < 0.6 f,$$

where f represents a focal length of overall lens system, $f_{(1,2,3,4)}$ represents a combined focal length of the first, second, third and fourth lens groups, d(6) represents a distance between the third lens group and the fourth lens group, and d(7) represents a thickness of the fourth lens group, and $$0.1 < f/r(5) < 0.2;$$

$$0.5 < f/r(11) < 0.7; \text{ and}$$

$$1.65 < [n(7)+n(8)]/2 < 1.75,$$

where r(5) represents a radius of curvature of a surface of the third lens group toward the object side, r(11) represents a radius of curvature of the fifth lens group of a closest surface to an image side, n(7) represents a refractive index of the sixth lens group, and n(8) represents a refractive index of the seventh lens group.

* * * * *